United States Patent
Itani et al.

(10) Patent No.: US 11,988,176 B2
(45) Date of Patent: May 21, 2024

(54) ENGINE CONTROL DEVICE

(71) Applicant: Yanmar Power Technology Co., Ltd., Osaka (JP)

(72) Inventors: Masahiro Itani, Osaka (JP); Hideo Shiomi, Osaka (JP); Keiji Kunisawa, Osaka (JP)

(73) Assignee: Yanmar Power Technology Co., Ltd., Osaka (JP)

(*) Notice: Subject to any disclaimer, the term of this patent is extended or adjusted under 35 U.S.C. 154(b) by 108 days.

(21) Appl. No.: 17/598,352

(22) PCT Filed: Feb. 10, 2020

(86) PCT No.: PCT/JP2020/005131
§ 371 (c)(1),
(2) Date: Sep. 27, 2021

(87) PCT Pub. No.: WO2020/195248
PCT Pub. Date: Oct. 1, 2020

(65) Prior Publication Data
US 2022/0163001 A1     May 26, 2022

(30) Foreign Application Priority Data
Mar. 28, 2019   (JP) .................................. 2019-064340

(51) Int. Cl.
| F02M 26/49 | (2016.01) |
| F02D 41/00 | (2006.01) |
| F02D 41/22 | (2006.01) |
| F02M 26/05 | (2016.01) |

(52) U.S. Cl.
CPC .......... *F02M 26/05* (2016.02); *F02D 41/0065* (2013.01); *F02M 26/49* (2016.02); *F02D 2041/227* (2013.01); *F02D 2250/26* (2013.01)

(58) Field of Classification Search
CPC .............. F02M 26/49; F02D 2041/227; F02D 41/0065
See application file for complete search history.

(56) References Cited

U.S. PATENT DOCUMENTS

2017/0074198 A1 * 3/2017 Habu ................ B60W 50/0205

FOREIGN PATENT DOCUMENTS

| EP | 2284377 A1 * | 2/2011 | ............. F02D 41/40 |
| JP | 4143868 B1 * | 9/2008 | ............. F02B 47/08 |
| WO | WO-2016017102 A1 * | 2/2016 | ......... F02D 41/0047 |

* cited by examiner

*Primary Examiner* — Ngoc T Nguyen
(74) *Attorney, Agent, or Firm* — Chris Mizumoto

(57) ABSTRACT

An engine control device controls an engine provided with an EGR device. The engine control device is provided with an abnormality determining unit, a restricted operation unit, and a restriction released operation unit. The abnormality determining unit determines whether an abnormality has arisen in the EGR device. The restricted operation unit performs restricted operation in which some functions of the engine are restricted, if the abnormality determining unit has determined that an abnormality has arisen in the EGR device. If a manipulation to release the restricted operation has been performed, the restriction released operation unit switches from restricted operation to restriction released operation in which the restrictions on some of the functions of the engine are released, and performs said restriction released operation.

8 Claims, 4 Drawing Sheets

ENGINE CONTROL DEVICE

CROSS-REFERENCE

This application is a US National Stage Application under 35 U.S.C. § 371 of International Application No. PCT/JP2020/005131 filed Feb. 10, 2020, which claims foreign priority of JP2019-064340 filed Mar. 28, 2019, the disclosures of which are hereby incorporated by reference in their entirety.

TECHNICAL FIELD

The present invention relates to an engine control device.

BACKGROUND ART

Conventionally, engine control devices that, regarding processing of exhaust gasses of an engine, can impose a restriction on an operation of the engine in accordance with a processing state have been known. Patent Literature 1 discloses an engine control device of this type.

A urea SCR system disclosed in Patent Literature 1 includes an engine, an exhaust purification device, a control device, and an operation restriction release device. Then, based on a residual level of a urea water in a urea water tank of the exhaust purification device, the control device performs an engine operation restriction. The engine operation restriction is prohibition of restarting the engine. After performing the engine operation restriction, the control device releases the engine operation restriction when an operation restriction release operation of an operation restriction release device is performed. Thereafter, when a predetermined time has elapsed, the control device restarts the engine operation restriction. After the engine operation restriction is restarted, the control device continues the engine operation restriction regardless of whether the urea water tank is refilled with urea water or not.

CITATION LIST

Patent Literature

Patent Literature 1: Japanese Unexamined Patent Application Publication No. 2015-175265

DISCLOSURE OF INVENTION

Problems to be Solved by the Invention

The above-described configuration of Patent Literature 1 is designed to perform an operation restriction on the urea SCR system to prevent deterioration of exhaust emission that occurs when the engine is operated without replenishing the urea water, and to temporarily release the operation restriction in an event of a disaster or the like.

As for an EGR (exhaust gas recirculation) system in which an EGR device recirculates a portion of the exhaust gas to an intake side as EGR gas is applied to an engine, deterioration of exhaust emission can possibly occur when an abnormality, such as a failure or the like, occurs in the EGR device. However, Patent Literature 1 only mentions urea SCR, but measures for prevention of deterioration of exhaust emission and disaster countermeasures for the EGR system are not taken.

In view of the forgoing, the present invention has been devised, and it is therefore an object of the present invention to provide an engine control device that controls an engine including an EGR device, the engine control device being configured to impose a restriction on an operation of the engine when an abnormality occurs in the EGR device and also release the restriction.

Means for Solving the Problems

Effect of the Invention

The problems to be solved by the present invention have been described above, and means for solving the problems and effects thereof will be described below.

According to an aspect of the present invention, an engine control device having the following configuration is provided. That is, the engine control device controls an engine including an EGR device. The EGR device recirculates a portion of the exhaust gas as EGR gas to an intake side. The engine control device includes an abnormality determining unit, a restricted operation unit, and a restriction released operation unit. The abnormality determining unit determines whether an abnormality has occurred in the EGR device. If the abnormality determining unit determines that an abnormality has occurred in the EGR device, the restricted operation unit performs a restricted operation in which some of functions of the engine are restricted. When a release operation of the restricted operation is performed, the restriction released operation unit switches from the restricted operation to the restriction released operation in which a restriction on some of the functions of the engine is released and performs the restriction released operation.

Thus, if the abnormality determining unit determines that an abnormality has occurred in the EGR device, that is, if a failure has occurred in a component of the EGR device (including sensors used for control), exhaust emission is deteriorated, and a restricted operation of the engine is performed to suppress an amount of exhaust emission from the engine. In addition, since the restricted operation of the engine can be switched to the restriction released operation, the engine can be operated normally by performing the restriction released operation in an event of a disaster, an emergency, or the like.

In the above-described engine control device, it is preferable that the restricted operation is restarted when a predetermined time has elapsed since a start of execution of the restriction released operation in a case where the release operation of the restricted operation is performed.

Thus, a time for which the restriction released operation is executed can be restricted to a predetermined time. Therefore, it is possible to prevent the engine from being operated normally without performing the above-described restriction at all times while the exhaust emission is deteriorated due to the failure of the EGR device.

It is preferable that the above-described engine control device has the following configuration. That is, the engine control device includes a measuring unit. The measuring unit measures an elapsed time since the release operation of the restricted operation is performed. The measuring unit temporarily stops measuring of the elapsed time when the engine is stopped during the restriction released operation and then restarts measuring of the elapsed time when the engine is restarted.

This prevents the elapsed time measured by the measuring unit from being reset to an initial value or measuring by the measuring unit from being terminated when the operator stops the engine during the restriction released operation for some reason. Accordingly, the restriction released operation of the engine can be performed for a predetermined time.

It is preferable that the above-described engine control device has the following configuration. That is, the measuring unit temporarily stops measuring when the key switch of the engine is turned off to stop the engine and then restarts measuring from a time when the key switch is turned on to restart the engine.

Thus, the elapsed time can be measured by the measuring unit in response to the operation of the key switch of the engine.

In the above-described engine control device, it is preferable that switching from the restricted operation to the restriction released operation can be executed a predetermined number of times during execution of the restricted operation.

Thus, the number of times switching from the restricted operation to the restriction released operation can be performed can be restricted to the predetermined number of times. Therefore, a situation where the engine is operated normally for a long period of time while the exhaust emission is deteriorated due to the failure of the EGR device can be prevented.

It is preferable that the above-described engine control device has the following configuration. That is, the engine control device includes a counting unit. The counting unit counts the number of times the restriction released operation is executed. The counting unit does not count the number of times the restriction released operation is executed when the restriction released operation is restarted by restarting the engine after the engine is stopped during the restriction released operation.

Thus, when the operator stops the engine during the restricted operation for some reason and then restarts the engine, the restriction released operation is restarted but, at this time, the number of times the restriction released operation is executed is not increased. Therefore, during the restricted operation of the engine, the restriction released operation can be reliably performed a predetermined number of times.

It is preferable that the above-described engine control device has the following configuration. That is, in the engine control device, the restriction on the restricted operation includes a first operation restriction and a second operation restriction. The first operation restriction restricts an engine output in a period from a start of execution of the restricted operation to a time when a predetermined set time elapses. The second operation restriction restricts the engine speed after the predetermined set time elapses and restricts the engine output to a lower level than that of the engine output restricted by the first operation restriction.

Thus, the restriction on the restricted operation can be performed in two stages. Therefore, a repair of the failure of the EGR device can be encouraged at a stage where the restricted operation of the first operation restriction is performed. If the failure of the EGR device is not repaired, the engine can be made very difficult to use at a next stage, and a repair of the failure of the EGR device can be strongly encouraged.

The above-described engine control device preferably further includes a restriction release operation member that performs the release operation of the restricted operation.

Thus, the restriction release operation member can be constituted by a button switch, a touch panel, or the like, and to comprise a button switch, touch panel, or the like, and can be installed in an appropriate location on a work machine using the engine. Therefore, an operator of a machine to which the engine is applied can properly execute an operation restriction release in accordance with a situation.

DESCRIPTION OF EMBODIMENTS

Figure 1:
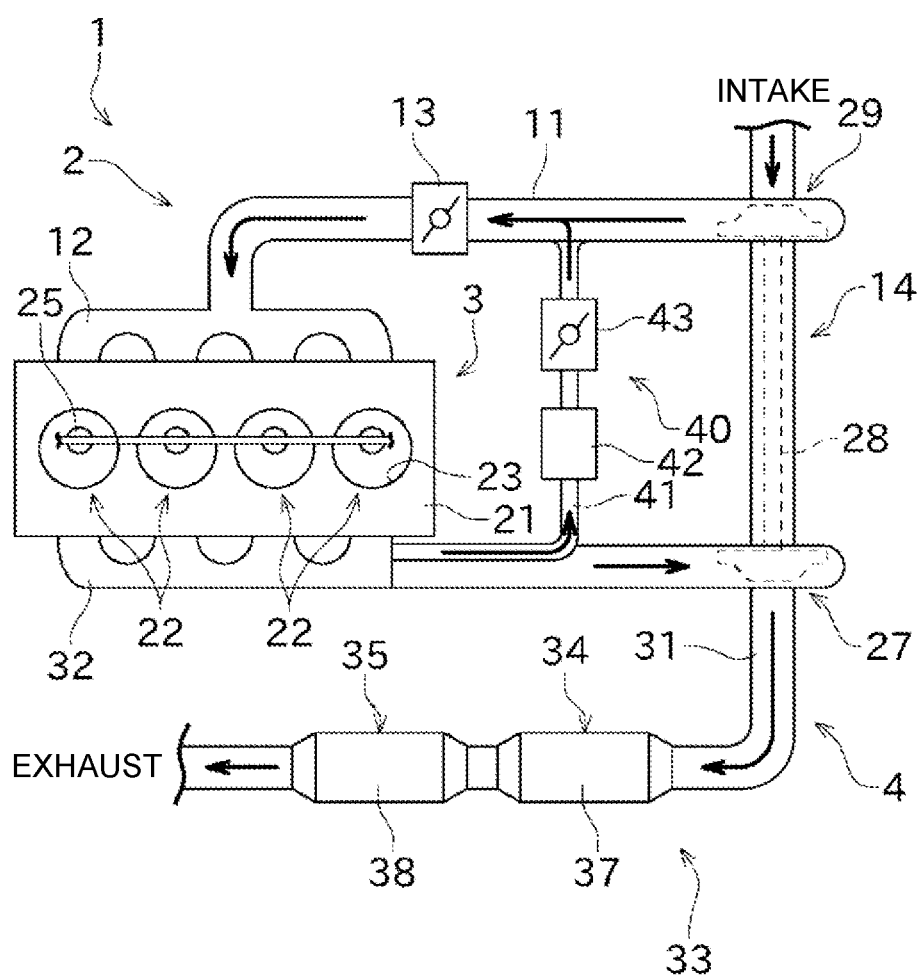
FIG. 1 is a view illustrating an overall configuration of an engine to which an engine control device of an embodiment of the present invention is applied.
Figure 2:
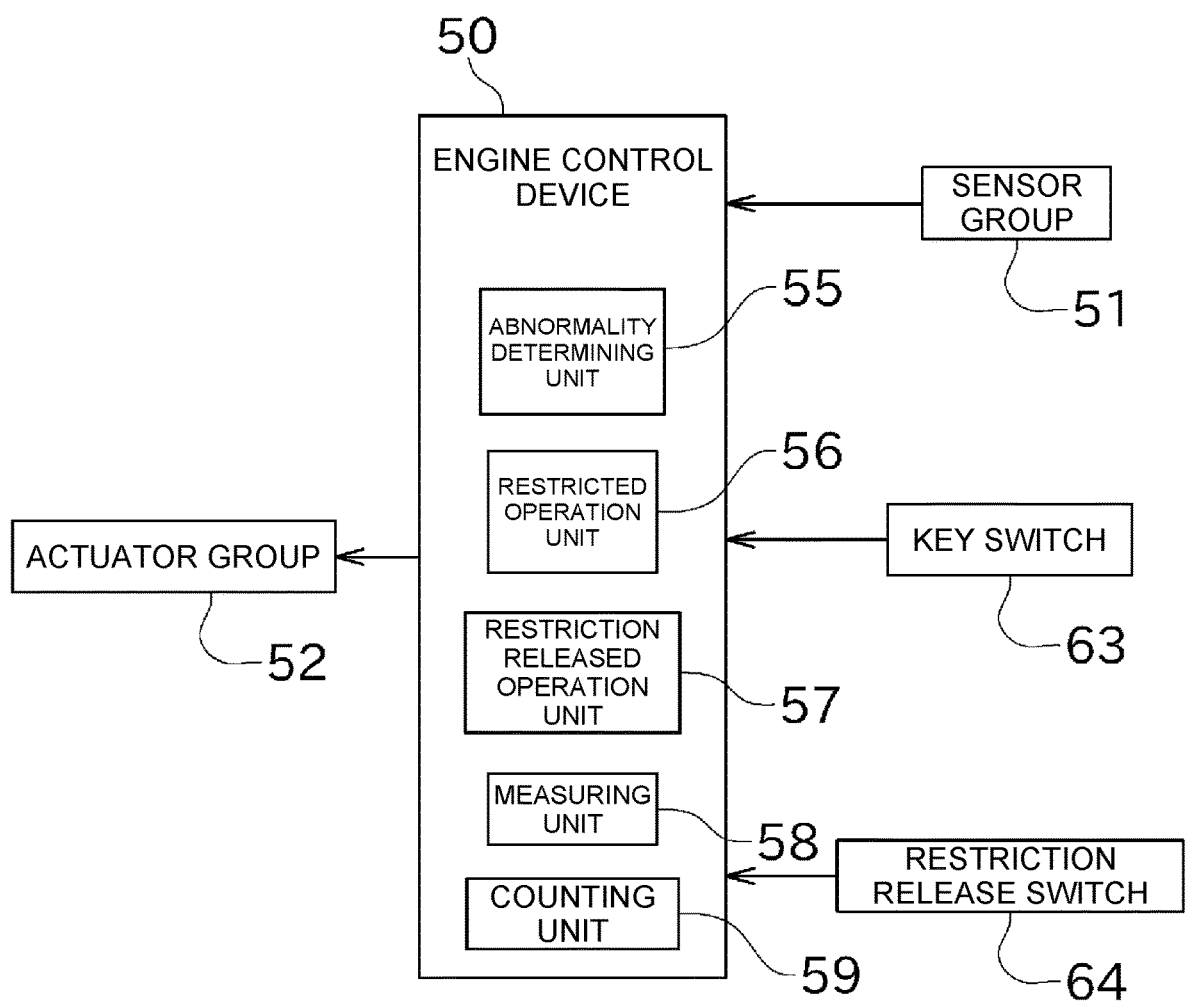
FIG. 2 is a block diagram illustrating a main electrical configuration of the engine.

Next, an embodiment of the present invention will be described with reference to the accompanying drawings. First, with reference to FIG. 1 and FIG. 2, a basic configuration of an engine 1 to which an engine control device 50 according to an embodiment of the present invention is applied will be described. FIG. 1 is a view illustrating an overall configuration of the engine 1. FIG. 2 is a block diagram illustrating a main electrical configuration of the engine 1.

The engine 1 illustrated in FIG. 1 supplies power to an unillustrated appropriate machine. The engine 1 includes an intake unit 2, a power generation unit 3, and an exhaust unit 4. Furthermore, the engine 1 includes the engine control device 50 illustrated in FIG. 2.

The intake unit 2 intakes air from outside. The intake unit 2 includes an intake pipe 11, an intake manifold 12, a throttle valve 13, and a turbocharger 14.

The intake pipe 11 forms an intake passage. The intake pipe 11 is connected to a combustion chamber 23, which will be described later, via the intake manifold 12 and allows air taken in from the outside to flow therein.

The intake manifold 12 is connected to a downstream end portion of the intake pipe 11 in a direction in which intake air flows in the intake passage. The intake manifold 12 distributes the air supplied via the intake pipe 11 in accordance with the number of cylinders of the power generation unit 3. The air after distribution is supplied to the combustion chambers 23 each being formed in a corresponding one of the cylinders.

The throttle valve 13 is arranged in a middle portion of the intake passage. The throttle valve 13 changes a cross-sectional area of the intake passage by changing its opening degree in accordance with a control command from the engine control device 50. Thus, an amount of air supplied to the intake manifold 12 can be adjusted.

The power generation unit 3 includes a cylinder block and a cylinder head 21. Pistons, crankshafts, and the like are arranged in the cylinder block. A plurality of cylinders 22 (four in this embodiment) are formed in an upper portion of the cylinder block.

A cylinder head 21 is arranged on an upper side of the cylinder block. The intake manifold 12 is provided to the cylinder head 21 and the cylinder block to correspond to each of the cylinders 22. Injectors 25 or the like that inject fuel into the intake manifold 12 are attached to the cylinder head 21.

In each of the combustion chambers 23 of the cylinders 22, air supplied from the intake manifold 12 is compressed, and then, fuel supplied from an unillustrated fuel supply unit is injected by the injectors 25. Thus, the fuel can be burned in the combustion chambers 23 to cause the pistons to reciprocate up and down. Power thereby obtained is transmitted to an appropriate device on a downstream side of the power via the crankshaft and the like.

The turbocharger 14 includes a turbine 27, a shaft 28, and a compressor 29. The compressor 29 is connected to the turbine 27 via the shaft 28. With this configuration, when the turbine 27 is caused to rotate by a flow of an exhaust gas discharged from the combustion chambers 23, the compressor 29 rotates. Thus, air purified by an unillustrated air cleaner is compressed and is forced to be taken in.

The exhaust unit 4 discharges exhaust gas generated in the combustion chambers 23 to the outside. The exhaust unit 4 includes an exhaust pipe 31, an exhaust manifold 32, and an ATD 33. ATD is an abbreviation for after treatment device.

The exhaust pipe 31 forms an exhaust gas passage. The exhaust pipe 31 is connected to the combustion chambers 23 via the exhaust manifold 32 and allows the exhaust gas discharged from the combustion chambers 23 to flow therein.

The exhaust manifold 32 is connected to an upstream end portion of the exhaust pipe 31 in a direction in which the exhaust gas flows. The exhaust manifold 32 collects the exhaust gas generated in each of the combustion chambers 23 and guides the collected exhaust gas to the exhaust pipe 31.

The ATD 33 is a device that performs exhaust gas aftertreatment. The ATD 33 purifies the exhaust gas by removing harmful components, such as NOx (nitrogen oxides), CO (carbon monoxide), HC (hydrocarbons), or the like, and a particulate matter (PM) contained in the exhaust gas. The ATD 33 is provided in the exhaust pipe 31.

The ATD 33 includes a DPF device 34 and an SCR device 35. DPF is an abbreviation for diesel particulate filter. SCR is an abbreviation for selective catalytic reduction.

The DPF device 34 removes carbon monoxide, nitric oxide, a particulate matter, or the like contained in the exhaust gas via an oxidation catalyst and a filter housed in a DPF case 37. The oxidation catalyst is a catalyst constituted by platinum or the like and is used for oxidizing (burning) unburned fuel, carbon monoxide, nitric monoxide, or the like contained in the exhaust gas. The filter is arranged on a downstream side of the exhaust gas relative to the oxidation catalyst and is configured as, for example, a fall flow type filter. The filter collects the particulate matter contained in the exhaust gas treated with the oxidation catalyst.

The exhaust gas that has passed through the DPF device 34 is mixed with urea supplied from an unillustrated urea supply device and is sent to the SCR device 35.

The SCR device 35 removes NOx contained in the exhaust gas via an SCR catalyst and a slip catalyst housed in the SCR case 38. The SCR catalyst is constituted by a material, such as a ceramic or the like, that adsorbs ammonia. NOx contained in the exhaust gas is reduced by contact with the SCR catalyst that has adsorbed ammonia and is changed into nitrogen and water. The slip catalyst is used for preventing ammonia from being released to the outside. The slip catalyst is a catalyst, such as platinum or the like, that oxidizes ammonia, and oxidizes ammonia to change ammonia into nitrogen and water through oxidization.

The exhaust gas that has passed through the SCR device 35 is discharged to the outside via the exhaust pipe connected to an exhaust gas outlet of the SCR case 38.

The engine 1 includes an EGR device 40. The EGR device 40 can recirculate a portion of the exhaust gas to an intake side through the EGR device 40.

The EGR device 40 includes an EGR pipe 41, an EGR cooler 42, and an EGR valve 43.

The EGR pipe 41 forms a passage through which an EGR gas, that is an exhaust gas recirculated to the intake side is guided to the intake pipe 11. The EGR pipe 41 is provided to connect the exhaust pipe 31 to the intake pipe 11.

The EGR cooler 42 is configured to cool the EGR gas. An EGR cooler 42 is provided in a middle portion of the EGR pipe 41.

The EGR valve 43 can adjust a recirculation amount of the EGR gas. The EGR valve 43 is provided in a middle portion of the EGR pipe 41 and in a downstream side of the EGR cooler 42 in a recirculation direction of the EGR gas. The EGR valve 43 changes its opening degree in response to a control signal from the engine control device 50. This changes an area of the EGR gas recirculation passage, and thus, the recirculation amount of the EGR gas can be changed.

The engine control device 50 is configured as a computer including an arithmetic unit constituted by a CPU or the like and a memory unit including a ROM, a RAM, or the like. Based on information from a sensor group 51 including various sensors, the arithmetic unit sends control commands to an actuator group 52 including various actuators to control various parameters (for example, a fuel injection amount, an air intake amount, or the like) used for operating the engine 1. The memory unit stores various programs and a plurality of control information preset with respect to the control of the engine 1. The engine control device 50 can operate as an abnormality determining unit 55, a restricted operation unit 56, a restriction released operation unit 57, a measuring unit 58, and a counting unit 59 by cooperation of the above-described hardware and software.

The sensor group 51 and the actuator group 52 are connected to the engine control device 50. A key switch 63 and a restriction release switch 64 are connected to the engine control device 50.

The key switch 63 is an operation member that can start or stop the engine 1. The key switch 63 is configured to be turned on or off. When the key switch 63 is turned on, the engine 1 is started. When the key switch 63 is turned off, the engine 1 is stopped.

The restriction release switch 64 is an operation member (restriction release operation member) that performs a release operation of the restricted operation of the engine 1. When the restriction release switch 64 is operated during the restricted operation of the engine 1, the restricted operation of the engine 1 is temporarily released. Note that this operation member is not limited to the restriction release switch 64. The restricted operation of the engine 1 will be described later.

In the engine control device 50, the abnormality determining unit 55 determines whether an abnormality has occurred in the EGR device 40. There are various kinds of abnormalities of the EGR device 40, and examples of the abnormalities include, for example, a failure of the EGR valve 43 or a failure of an EGR valve opening detection sensor that detects an opening degree of the EGR valve 43. The abnormality determining unit 55 determines, for example, that an abnormality has occurred in the EGR device 40 if the recirculation amount of the EGR gas is too small or too large. Note that a method for determining an abnormality of the EGR device 40 and occurrence thereof is not limited thereto.

The restricted operation unit 56 controls the engine 1 such that a restricted operation in which some of functions of the engine 1 are restricted is performed if the abnormality determining unit 55 determines that an abnormality has occurred in the EGR device 40. Specifically, the above-described restricted operation control performed by the restricted operation unit 56 is control of restricting output of the engine 1 (which will be hereinafter referred to as engine output).

In this embodiment, a restriction of the engine output includes a first operation restriction and a second operation restriction. In accordance with a situation, one of the first operation restriction and the second operation restriction is selected and applied. The first operation restriction restricts the engine output in a period from a start of execution of a restricted operation to a time when a predetermined set time elapses. The second operation restriction restricts engine speed after the predetermined set time elapses and restricts the engine output to a lower level than that of the engine output restricted by the first operation restriction.

The restricted operation control by the restricted operation unit 56 is released when the abnormality determining unit 55 no longer determines that an abnormality has occurred in the EGR device 40. In this case, the engine 1 automatically returns to a normal operation where restricted operation control is not performed. Note that determination by the abnormality determining unit 55 is performed as appropriate during execution of a restricted operation.

In a case where a release operation is performed to release a restricted operation, the restriction released operation unit 57 controls the engine 1 such that the restricted operation is switched to the restriction released operation in which a restriction on some of the functions of the engine 1 is released in response to the release operation. When an operation state of the engine 1 is switched from the restricted operation to the restriction released operation, the above-described restriction of the engine output is released.

However, in a case where fail-safe control is being executed in the engine 1, a restriction imposed by the fail-safe control is not released. Specifically, for example, in a case where the engine control device 50 detects that an abnormality has occurred in any one of the components of the engine 1 other than the EGR device 40 and the output of the engine 1 is restricted from a viewpoint of maintaining a minimum operation while protecting the component device, even when an instruction for a restriction released operation is given, the restriction is not released. The release operation performed for releasing the restricted operation is an operation in which the restriction release switch 64 is pressed while the restricted operation control of the engine 1 is performed by the restricted operation unit 56 in this embodiment, but not limited thereto.

A restricted operation of the engine 1 is performed by determination that an abnormality has occurred in the EGR device 40 as a trigger. If an abnormality has occurred in a component of the EGR device 40, then from a viewpoint of exhaust emissions, it is preferable that the above-described restricted operation control is performed. However, circumstances may arise, for example, in an event of a disaster, an emergency, or the like when the engine output needs to be sufficiently secured. In this case, restriction released operation control in which the engine output is not restricted can be performed by an operator by performing an operation of the restriction release switch 64 at his or her own discretion.

Figure 3:
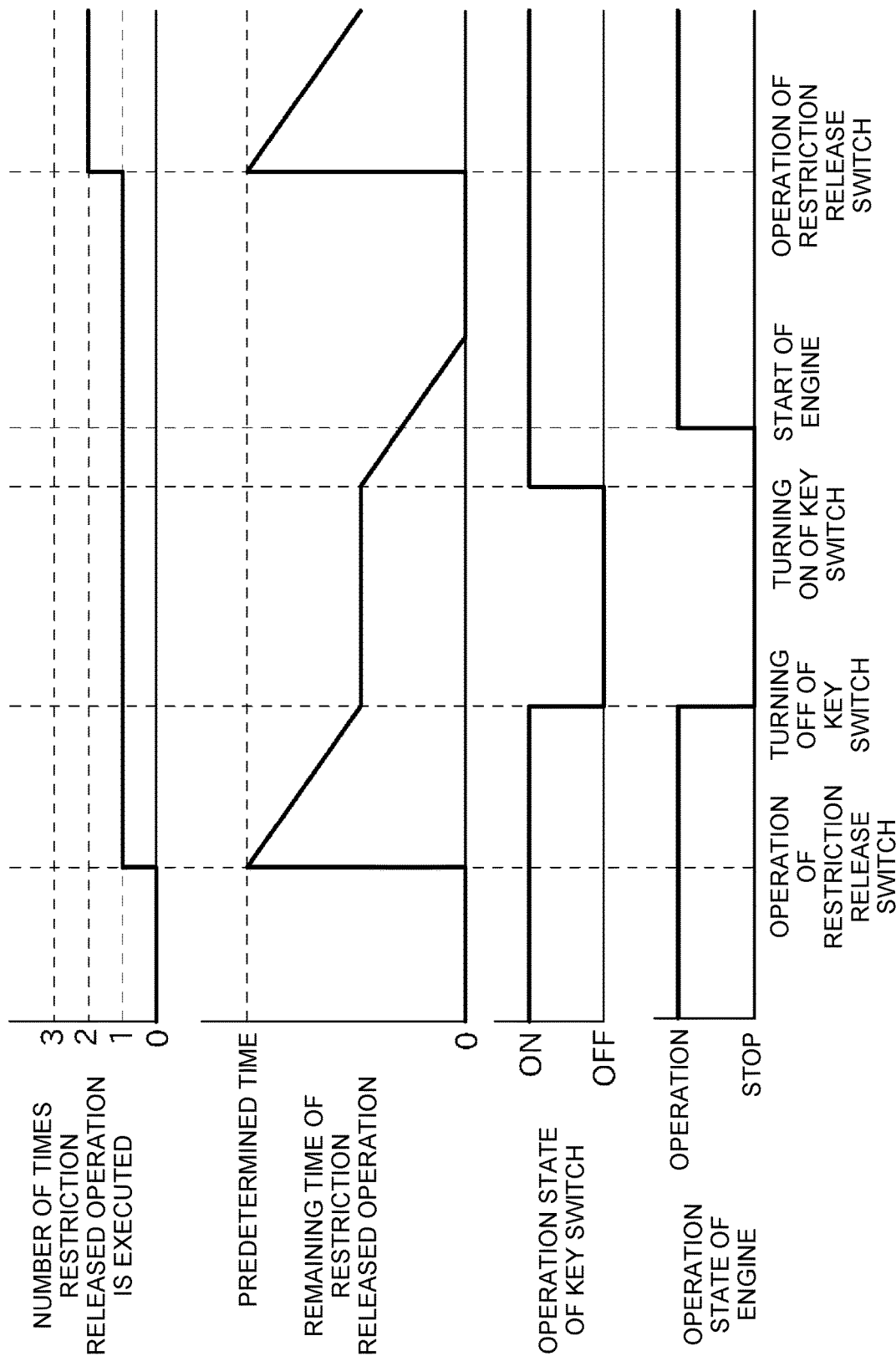
FIG. 3 is a timing chart illustrating control performed when a restricted operation is switched to a restriction released operation.

In this embodiment, an execution time of the restriction released operation is restricted so that the restriction released operation is not abused beyond its original purpose. When switching to the restriction released operation is performed during the restricted operation, the restriction released operation is executed for a predetermined time from a start of the restriction released operation. Specifically, when the restriction release switch 64 is operated, the measuring unit 58 starts measuring an elapsed time since a time of the operation, and when the elapsed time reaches a predetermined time, a remaining time for which the restriction released operation can be executed becomes zero, as illustrated in a timing chart in FIG. 3, and the restriction released operation is terminated. When the restriction released operation is terminated, switching to the restricted operation is performed to restart the restricted operation. Note that the predetermined time for which the restriction released operation can be performed can be set arbitrarily.

When the engine 1 is stopped during the restriction released operation, measuring of the elapsed time by the measuring unit 58 is temporarily stopped. Thereafter, when the engine 1 is restarted, the measuring unit 58 restarts measuring of the elapsed time. Measuring after the restart is performed such that a new elapsed time is added to the elapsed time at the time when the engine 1 is stopped.

Specifically, the engine 1 is stopped by turning off the key switch 63 during the restriction released operation, and measuring of the elapsed time by the measuring unit 58 is temporarily stopped in response to turning off of the key switch 63. Thereafter, the engine 1 is restarted by turning on the key switch 63, and measuring of the elapsed time by the measuring unit 58 is restarted in response to turning on of the key switch 63.

In other words, measuring of the elapsed time by the measuring unit 58 is temporarily stopped when the key switch 63 is turned off during the restriction released operation. In a case where measuring of the elapsed time by the measuring unit 58 is temporarily stopped, measuring of the elapsed time by the measuring unit 58 is restarted when the key switch 63 is turned on.

The restriction released operation during the restricted operation of the engine 1 can be performed only by a predetermined number of times. In other words, the number of times the restriction released operation is executed during the restricted operation of the engine 1 is restricted to a predetermined number of times. The number of times the restriction released operation is executed is counted once by the counting unit 59 each time the restriction released operation is executed for a predetermined time during execution of the restricted operation. When the number of times the restriction released operation is executed reaches a predetermined number, execution of the restriction released operation is prohibited thereafter. Note that the predetermined number of times can be set arbitrarily.

The counting unit 59 does not count the number of times the restriction released operation is executed when the restriction released operation is restarted by restarting the engine 1 after the engine 1 is stopped during the restriction released operation. In a case where the restricted operation is performed again after the engine 1 returns to the normal operation due to change of a determination result by the abnormality determining unit 55 to a determination result that no abnormality has occurred in the EGR device 40 during the restricted operation, the counting unit 59 resets the number of times the restriction released operation is executed counted during the previous restricted operation to an initial value, and then, performs counting.

Subsequently, specific processing to be performed for the restricted operation and the restriction released operation of the engine 1 will be described with reference to a flowchart of FIG. 4.

When the processing starts, the engine control device 50 normally operates the engine 1 (Step S101). During the normal operation of the engine 1, the engine control device 50 (abnormality determining unit 55) determines whether an abnormality has occurred in the EGR device 40 (Step S102).

In determination in Step S102, if it is determined that an abnormality has occurred in the EGR device 40 (abnormality determination), the engine control device 50 (restricted operation unit 56) performs a restricted operation of the engine 1 (Step S103). If no abnormality determination is made in Step S102, the process returns to Step S101.

After Step S103, the engine control device 50 determines whether a release operation by the restriction release switch 64 has been performed by the operator (Step S104).

In determination in Step S104, if no release operation by the restriction release switch 64 has been performed, the engine control device 50 determines whether a determination result (abnormality determination) by the abnormality determining unit 55 has been changed (Step S105). A change in the abnormality determination means, in other words, that the abnormality is no longer determined. In determination in Step S105, if the abnormality determination is changed, it is meant that no abnormality has occurred in the EGR device 40. Therefore, the process returns to S101 and the engine 1 is returned to the normal operation. In determination in Step S105, if the abnormality determination is maintained, the process returns to Step S103 and the restricted operation of the engine 1 is continued.

In determination in Step S104, if a release operation by the restriction release switch 64 is performed, the engine control device 50 (restriction released operation unit 57) performs a restriction released operation of the engine 1 (Step S106). Then, the engine control device 50 (measuring unit 58) starts measuring an elapsed time since the release operation of the restriction release switch 64 is performed (Step S107).

After starting measuring of the elapsed time, the engine control device 50 determines whether the measured elapsed time has reached a predetermined time (Step S108). The predetermined time defines a time for which the restriction released operation can be executed during the restricted operation of the engine 1, as described above.

In determination in Step S108, if the elapsed time has reached the predetermined time, the process returns to Step S103, and the engine control device 50 switches the restriction released operation of the engine 1 to the restricted operation. That is, the restriction released operation of the engine 1 is terminated and the restricted operation of the engine 1 is restarted.

In determination in Step S108, if the elapsed time has not reached the predetermined time, the engine control device 50 determines whether the key switch 63 has been turned off (Step S109). That is, determination on whether the engine 1 has stopped is performed.

When the key switch 63 is turned off, the engine control device 50 (measuring unit 58) temporarily stops measuring (Step S110). Note that, since the above-described elapsed time is stored in a non-volatile memory, even if power supply of the engine control device 50 is turned off, measuring of the elapsed time can be restarted without any problem when the power supply is turned on again. If the key switch 63 has not been turned off, the process returns to Step S108 and the restriction released operation of the engine 1 and measuring of the elapsed time are continued.

While measuring of the elapsed time is temporarily stopped, the engine control device 50 determines whether the key switch 63 has been turned on (Step S111). That is, determination on whether the engine 1 has been restarted is performed.

If the key switch 63 has been turned on, the engine control device 50 (measuring unit 58) restarts measuring of the elapsed time (Step S112). Thereafter, the process returns to Step S108. On the other hand, if it is determined that the key switch 63 has not been turned on, processing of Step S111 is repeated.

Figure 4:
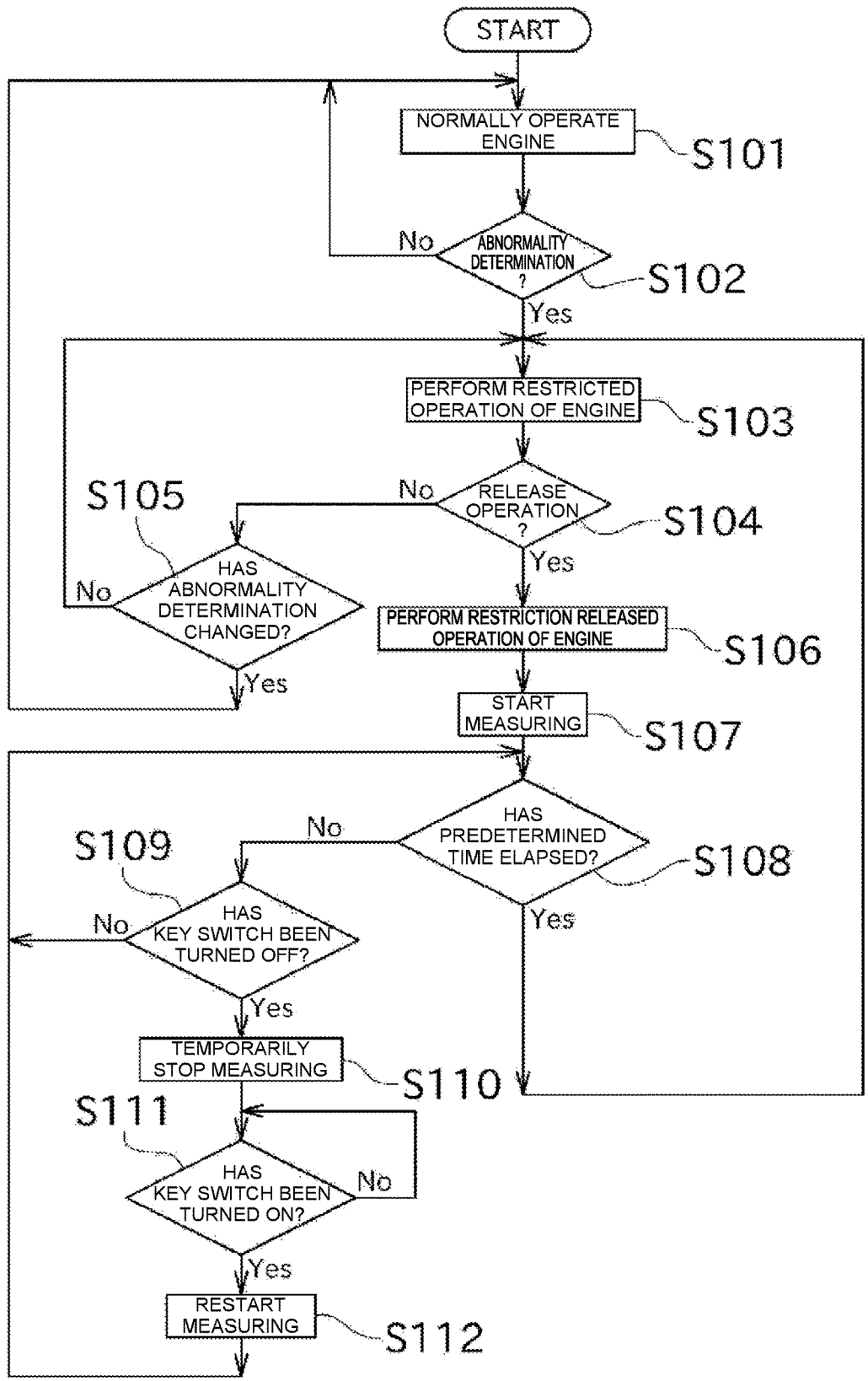
FIG. 4 is a flowchart of processing performed to perform a restricted operation and a restriction released operation.

In the flowchart of FIG. 4, processing of realizing a restriction on the number of times the restriction released operation is executed is omitted. However, by disabling the restriction release operation when a count value of the restriction released operation has reached the count restriction value in Step S104, a restriction on the number of times the restriction released operation is executed can be easily realized. Similar to the above-described elapsed time, the count value of the restriction released operation is stored in the non-volatile memory.

By performing the above processing, the restricted operation can be performed in an event of a failure of the EGR device 40, and the restricted operation can be exceptionally released to an extent normally required in an event of a disaster or the like. This control provides a good balance between preventing deterioration of emission and ensuring an engine operation in an event of an emergency.

As described above, the engine control device 50 of this embodiment controls the engine 1 including the EGR device 40. The EGR device 40 recirculates a portion of the exhaust gas as EGR gas to an intake side. The engine control device 50 includes the abnormality determining unit 55, the restricted operation unit 56, and the restriction released operation unit 57. The abnormality determining unit 55 determines whether an abnormality has occurred in the EGR device 40. The restricted operation unit 56 performs the restricted operation in which some of the functions of the engine 1 are restricted if the abnormality determining unit 55 determines that an abnormality has occurred in the EGR device 40. The restriction released operation unit 57 switches from the restricted operation to the restriction released operation in which a restriction on some of the functions of the engine 1 is released and performs this restriction released operation, when a restriction operation of the restricted operation is performed.

Thus, if the abnormality determining unit 55 determines that an abnormality has occurred in the EGR device 40, the exhaust emissions are deteriorated, and the restricted operation of the engine 1 can be performed to suppress an amount of exhaust emission emitted from the engine 1. An abnormality of the EGR device 40 may be an abnormality of a component (such as the EGR valve 43 or the like) of the EGR device 40 or an abnormality of a sensor or the like used for control. In addition, since the restricted operation of the engine 1 can be switched to the restriction released operation, the engine 1 can be operated normally by performing the restriction released operation in an event of a disaster, an emergency, or the like.

In the engine control device 50 of this embodiment, in a case where a release operation of the restricted operation is performed, the restricted operation is restarted when a predetermined time has elapsed since a start of execution of the restriction released operation.

Thus, a time for which the restriction released operation is executed can be restricted to a predetermined time. Accordingly, a situation where the engine 1 is operated normally without performing the above-described restriction at all times while exhaust emission is deteriorated due to a failure of the EGR device 40 can be prevented.

The engine control device 50 of this embodiment includes the measuring unit 58. The measuring unit 58 measures an elapsed time since a release operation of the restricted operation was performed. The measuring unit 58 temporarily stops measuring of the elapsed time when the engine 1 stops during the restriction released operation, and then, restarts measuring of the elapsed time when the engine is restarted.

This prevents the elapsed time measured by the measuring unit 58 from being reset to an initial value or measuring by the measuring unit 58 from being terminated when the operator stops the engine 1 during the restriction released operation for some reason. Accordingly, the restriction released operation of the engine 1 can be performed for a predetermined time.

In the engine control device 50 of this embodiment, the measuring unit 58 temporarily stops measuring when the key switch 63 of the engine 1 is turned off to stop the engine 1, and then, restarts measuring from a time when the key switch 63 is turned on to restart the engine 1.

Thus, the elapsed time can be measured by the measuring unit 58 in response to an operation of the key switch 63 of the engine 1.

In the engine control device 50 of this embodiment, switching from the restricted operation to the restriction released operation can be performed a predetermined number of times during execution of the restricted operation.

Thus, the number of times switching from the restricted operation to the restriction released operation can be limited to a predetermined number of times. Therefore, it is possible to prevent the engine from being operated normally for a long period of time with deteriorated exhaust emission due to a failure of the EGR device 40.

The engine control device 50 of this embodiment includes the counting unit 59. The counting unit 59 counts the number of times the restriction released operation is executed. The counting unit 59 does not count the number of times the restriction released operation is executed when the restriction released operation is restarted by restarting the engine 1 after the engine 1 is stopped during the restriction released operation.

Thus, when the operator stops the engine 1 during the restriction released operation for some reason and then restarts the engine 1, the restriction released operation is restarted, but the number of times the restriction released operation is executed is not increased at this time. Therefore, during the restricted operation, the restriction released operation of the engine 1 can be reliably operated a predetermined number of times.

In the engine control device 50 of this embodiment, a restriction on a restricted operation includes a first operation restriction and a second operation restriction. The first operation restriction restricts the engine output in a period from a start of execution of a restricted operation to a time when a predetermined set time elapses. The second operation restriction restricts engine speed after the predetermined set time elapses and restricts the engine output to a lower level than that of the engine output restricted by the first operation restriction.

Thus, the restriction on the restricted operation can be performed in two stages. Therefore, a repair of the failure of the EGR device 40 can be encouraged at a stage where the restricted operation of the first operation restriction is performed. If the failure of the EGR device 40 is not repaired, a repair of the failure of the EGR device 40 can be strongly encouraged by making the engine 1 very difficult to use at a next stage.

The engine control device 50 of this embodiment includes the restriction release switch (restriction release operation member) 64 that performs a restriction operation of the restricted operation.

Thus, the restriction release switch 64 can be installed in an appropriate location on a machine using the engine 1. Therefore, an operator of this machine can properly execute an operation restriction release in accordance with a situation.

Although a preferred embodiment of the present invention has been described above, the above-described configuration can be modified as follows, for example.

In the above-described embodiment, the restriction on the restricted operation is a two-stage restriction in which the first operation restriction and the second operation restriction are performed in sequence, but the restriction on the restricted operation is not limited thereto, for example, may be only a restriction on the engine output performed from a start of execution of the restricted operation, and may be a restriction on each of the engine speed and the engine output performed from a start of execution of the restricted operation.

In the above-described embodiment, the operation member that performs the release operation of the restricted operation is the restriction release switch 64, but the operation member is not limited thereto and may be, for example, an operation member constituted by a touch panel.

In the above-described embodiment, the engine control device 50 releases the restricted operation of the engine 1 in response to an operation of the restriction release switch 64 by the operator. However, the engine control device 50 may be configured to automatically release the restricted operation in accordance with a situation (for example, in accordance with a detection result of any sensor of the sensor group 51) without the operation of the operator.

Considering the above-described teachings, clearly, many changes and modifications can be made to the present invention. Therefore, it should be understood that the present invention may be practiced in a manner other than that described herein within the scope of the appended claims.

DESCRIPTION OF REFERENCE NUMERALS

1 Engine
40 EGR device
50 Engine control device
55 Abnormality determining unit
56 Restricted operation unit
57 Restriction released operation unit
58 Measuring unit
59 Counting unit
64 Restriction release switch (restriction release operation member)

The invention claimed is:

1. An engine control device that controls an engine including an EGR device that recirculates a portion of exhaust gas as EGR gas to an intake side, the engine control device comprising:
   an abnormality determining unit that determines whether an abnormality has occurred in the EGR device;

a restricted operation unit that, if the abnormality determining unit determines that an abnormality has occurred in the EGR device, performs a restricted operation in which some functions of the engine are restricted including restricting an engine output; and a restriction released operation unit that, when a release operation of the restricted operation is performed, switches from the restricted operation to the restriction released operation in which a restriction on some of the functions of the engine is released and performs the restriction released operation.

2. The engine control device according to claim 1, wherein the restricted operation is restarted when a predetermined time has elapsed since a start of execution of the restriction released operation in a case where the release operation of the restricted operation is performed.

3. The engine control device according to claim 2, further comprising:

a measuring unit that measures an elapsed time since the release operation of the restricted operation is performed, wherein the measuring unit temporarily stops measuring of the elapsed time when the engine is stopped during the restriction released operation and then restarts measuring of the elapsed time when the engine is restarted.

4. The engine control device according to claim 3, wherein the measuring unit temporarily stops measuring when a key switch of the engine is turned off to stop the engine and then restarts measuring from a time when the key switch is turned on to restart the engine.

5. The engine control device according to claim 1, wherein switching from the restricted operation to the restriction released operation can be executed a predetermined number of times during execution of the restricted operation.

6. The engine control device according to claim 5, further comprising:

a counting unit that counts the number of times the restriction released operation is executed, wherein the counting unit does not count the number of times the restriction released operation is executed when the restriction released operation is restarted by restarting the engine after the engine is stopped during the restriction released operation.

7. The engine control device according to claim 1, wherein the restriction on the restricted operation in regard to the engine output includes a first operation restriction that restricts the engine output in a period from a start of execution of the restricted operation to a time when a predetermined set time elapses, and a second operation restriction that restricts the engine speed after the predetermined set time elapses and restricts the engine output to a lower level than that of the engine output restricted by the first operation restriction.

8. The engine control device according to claim 1, further comprising:

a restriction release operation member that performs the release operation of the restricted operation.

* * * * *